No. 628,225. Patented July 4, 1899.
P. E. M. JAMAIN.
APPARATUS FOR COMPRESSING POWDERED SUBSTANCES.
(Application filed Dec. 2, 1897.)
(No Model.) 9 Sheets—Sheet 3.
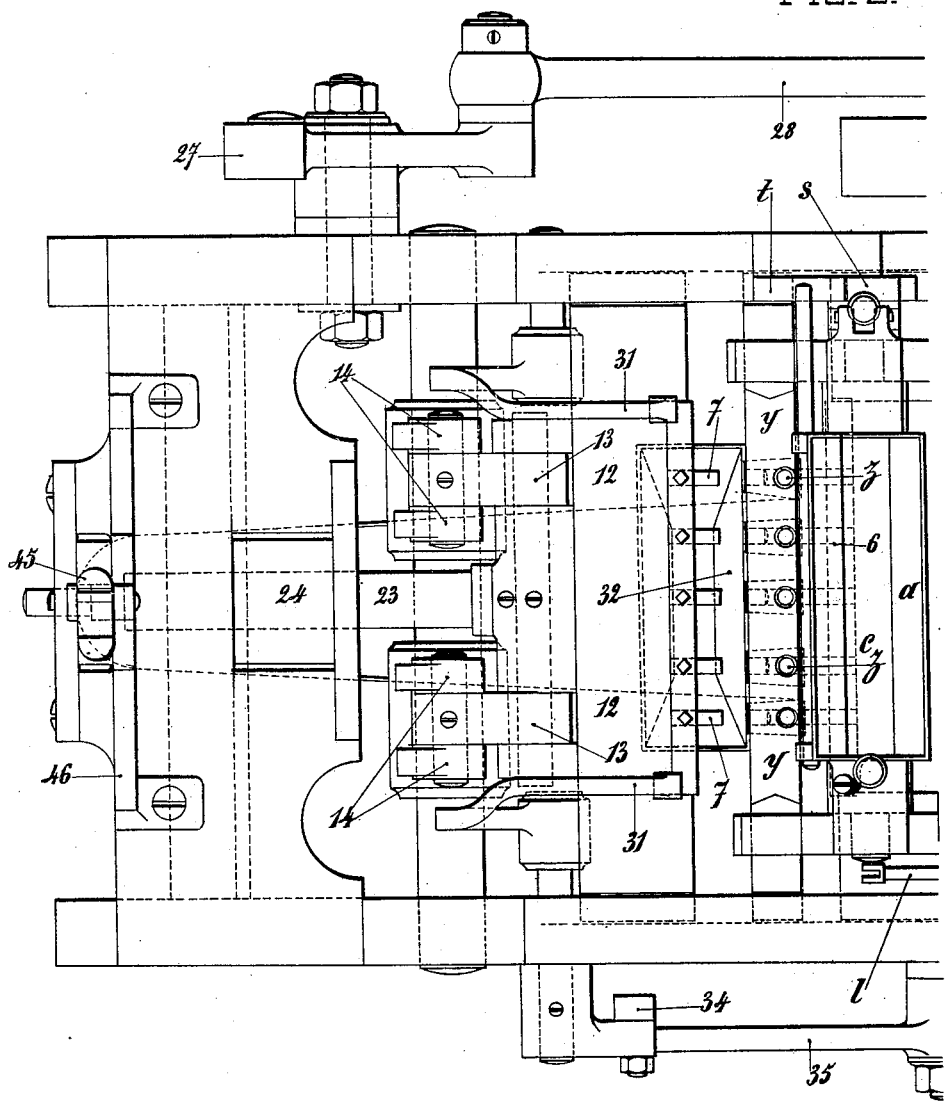

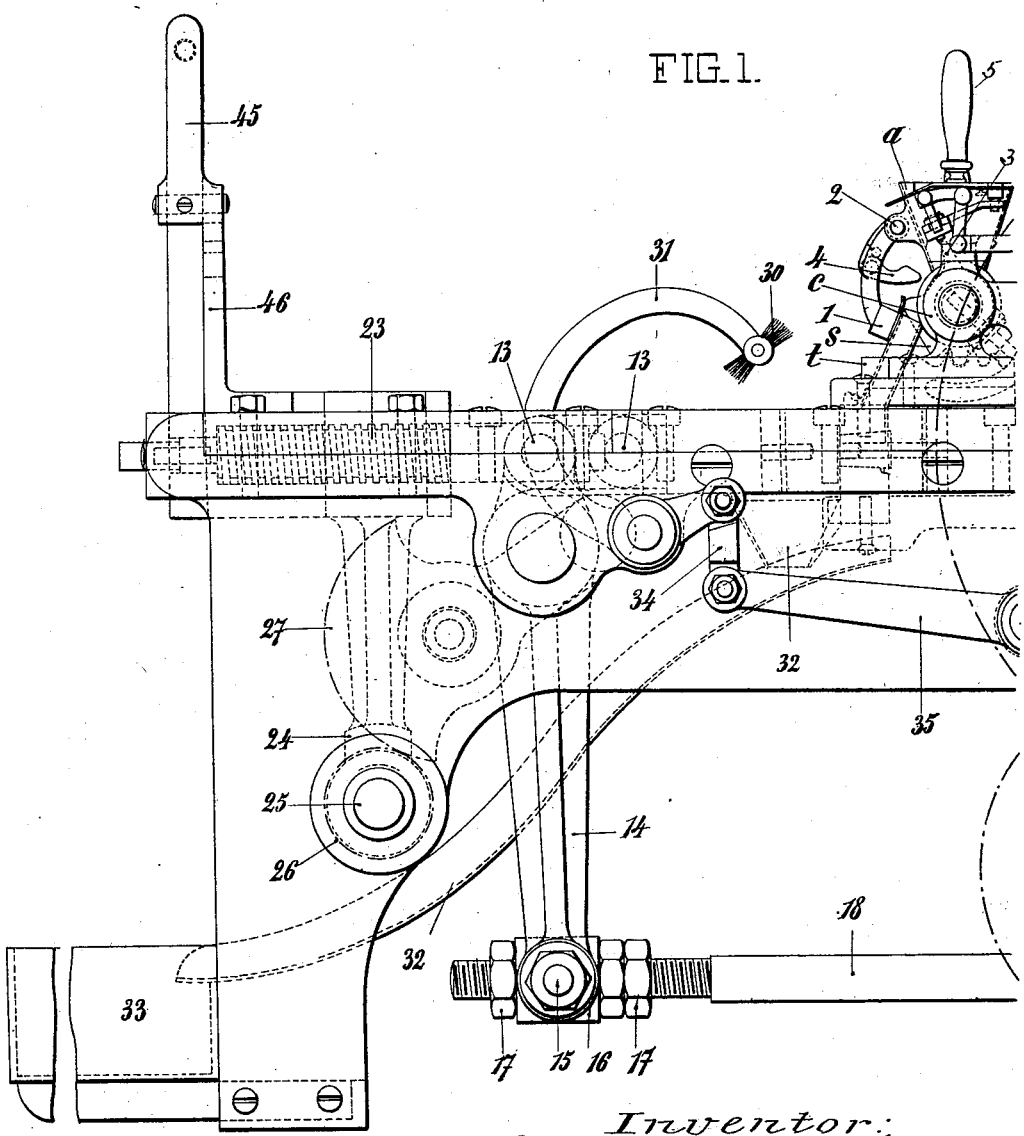

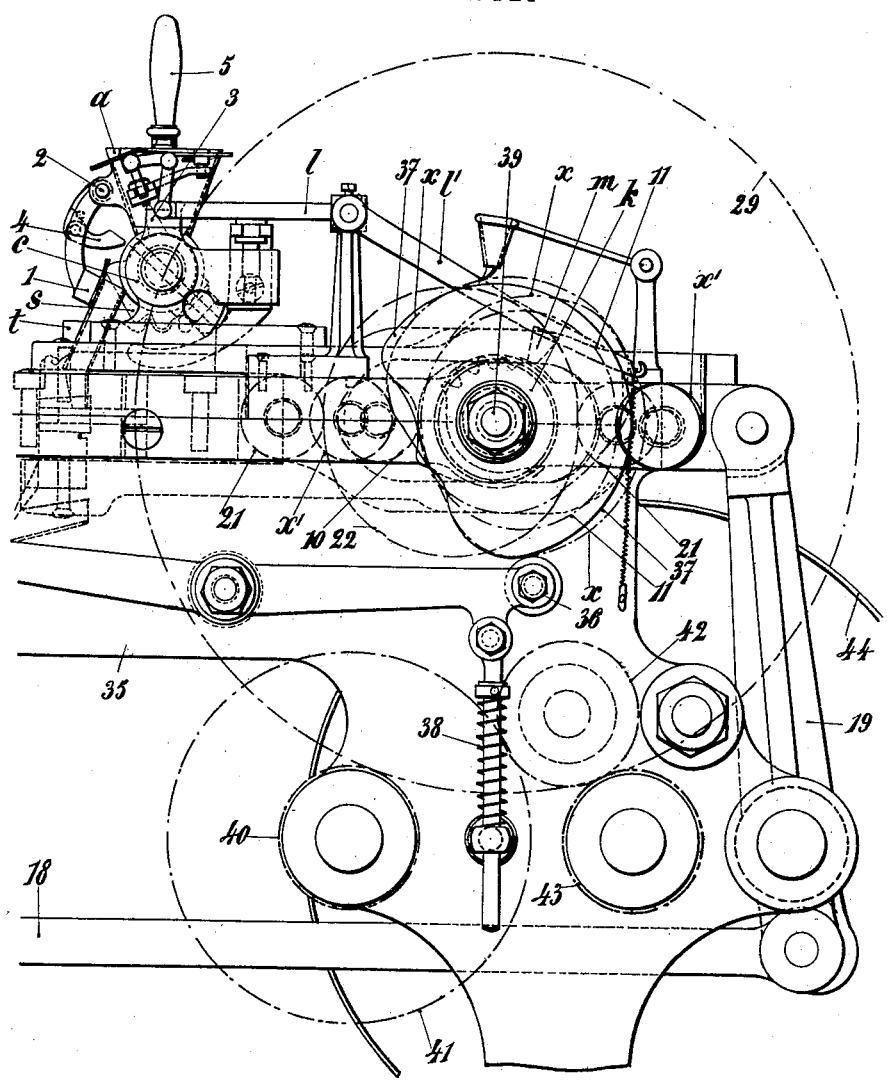

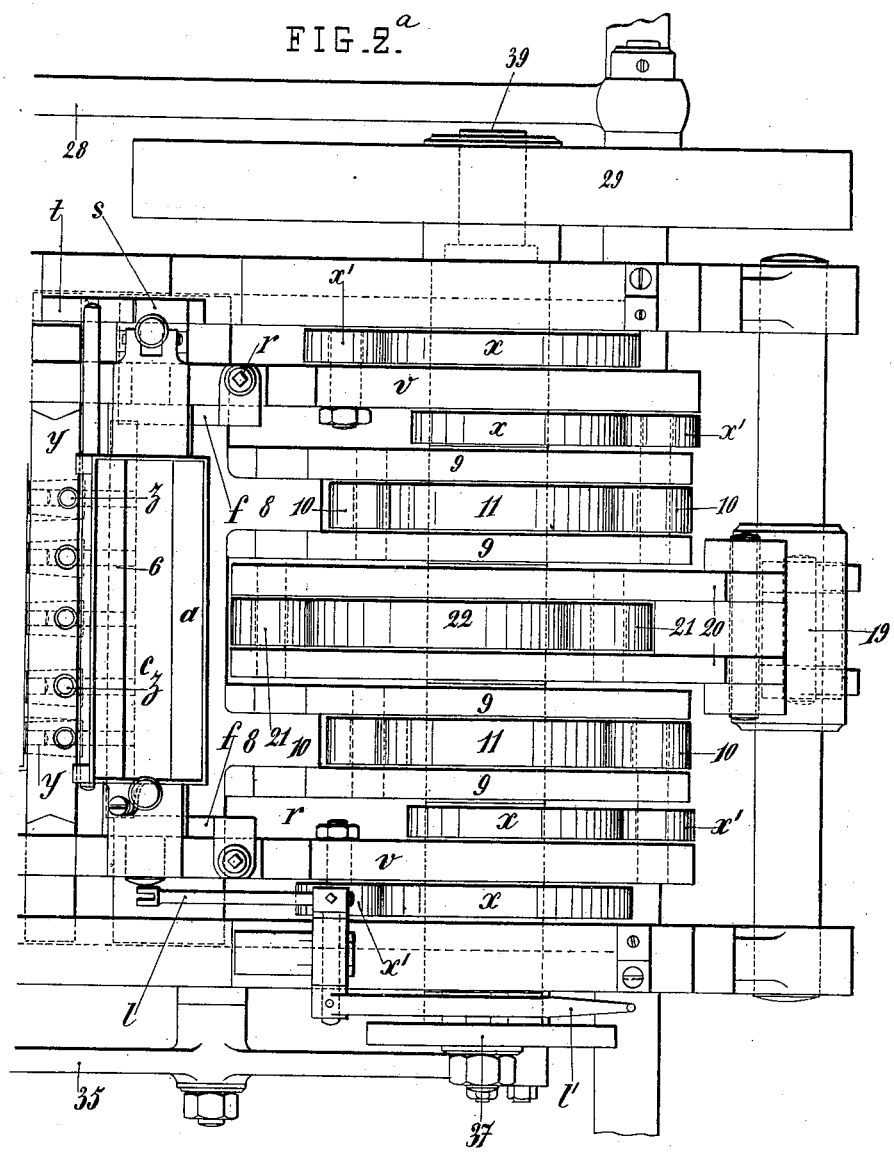

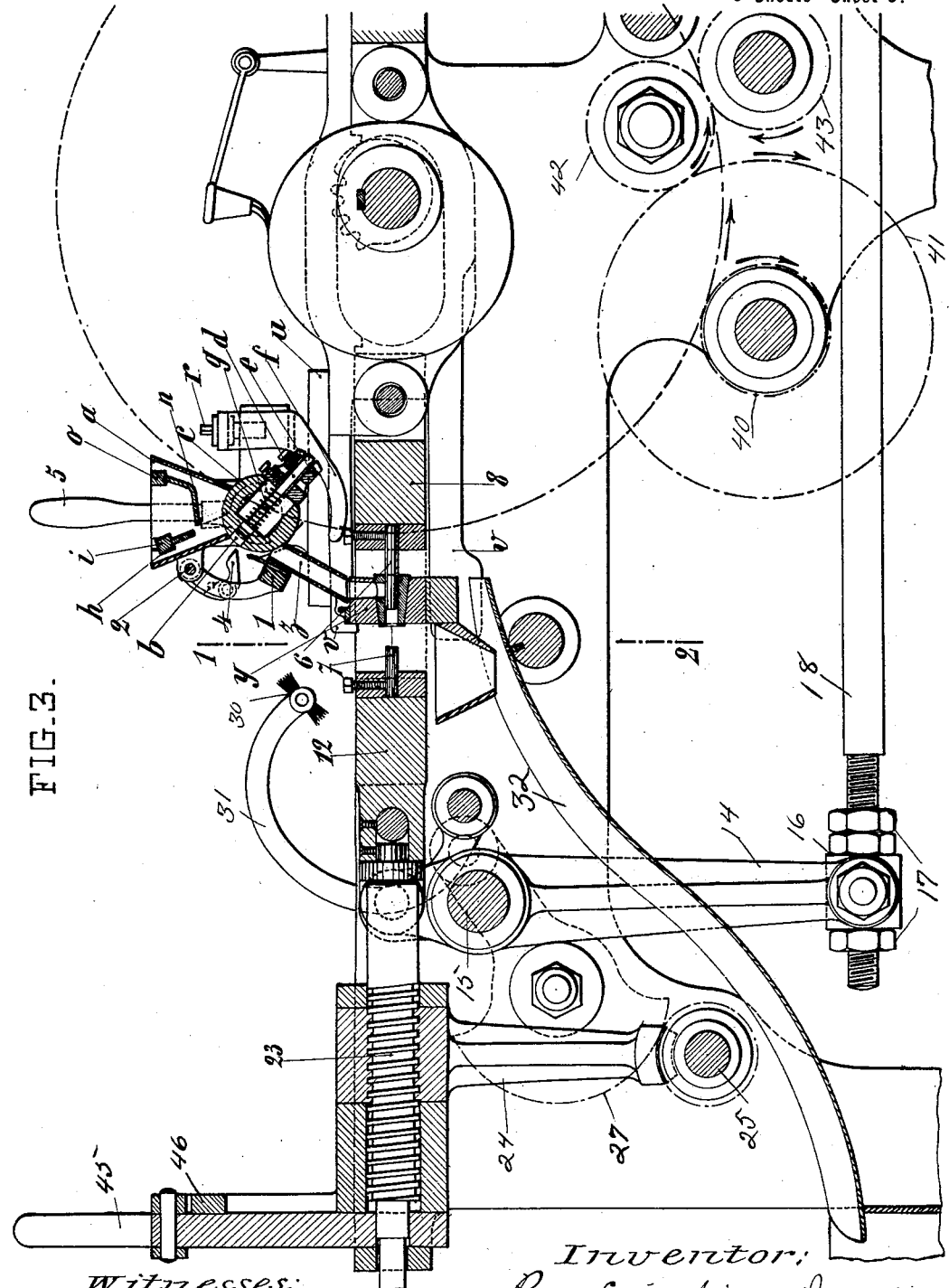

No. 628,225. Patented July 4, 1899.
P. E. M. JAMAIN.
APPARATUS FOR COMPRESSING POWDERED SUBSTANCES.
(Application filed Dec. 2, 1897.)

(No Model.) 9 Sheets—Sheet 6.

FIG. 4.

FIG. 5.

Witnesses:

Inventor:
Paul Eugène Meinrad Jamain
By
his Attorneys.

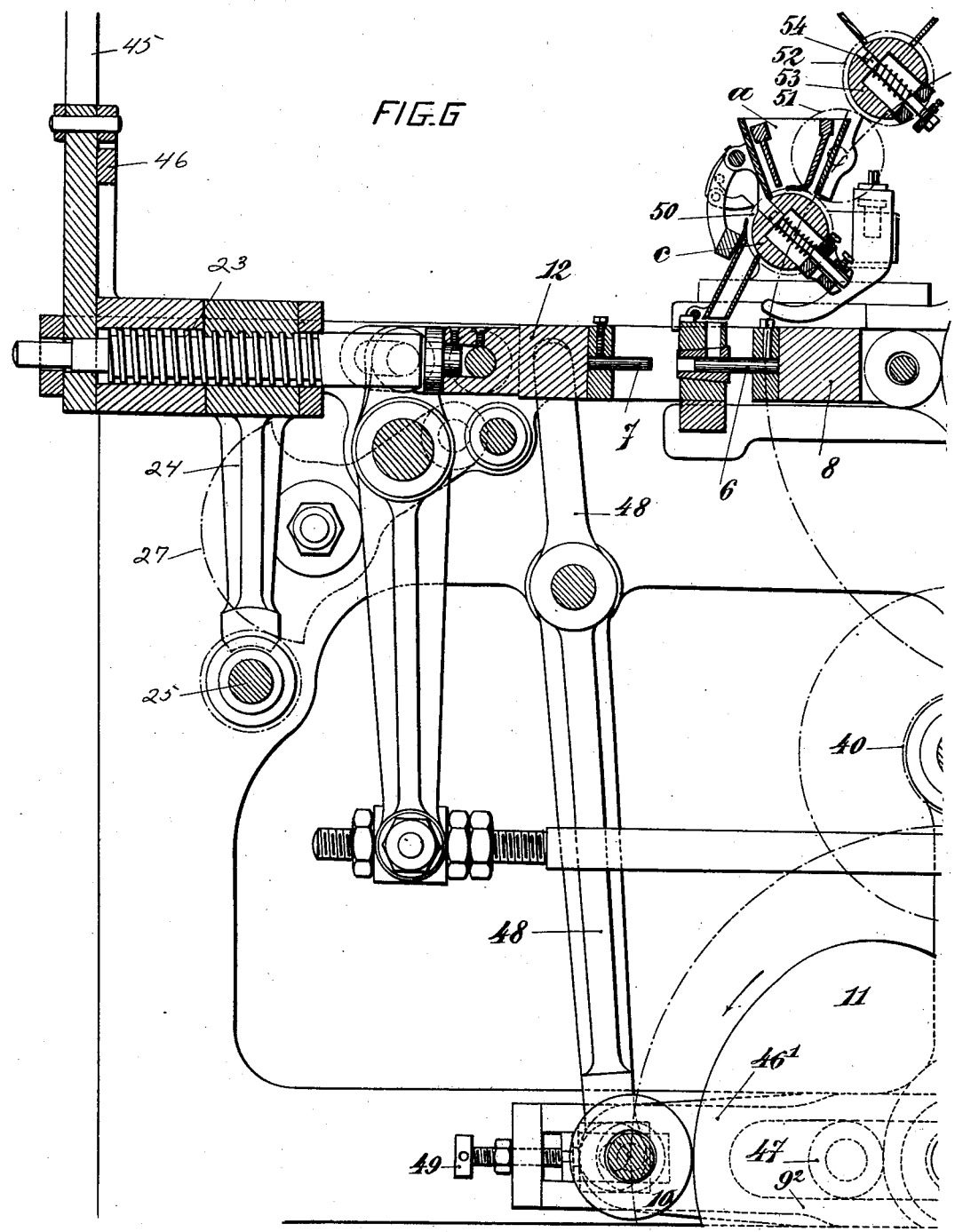

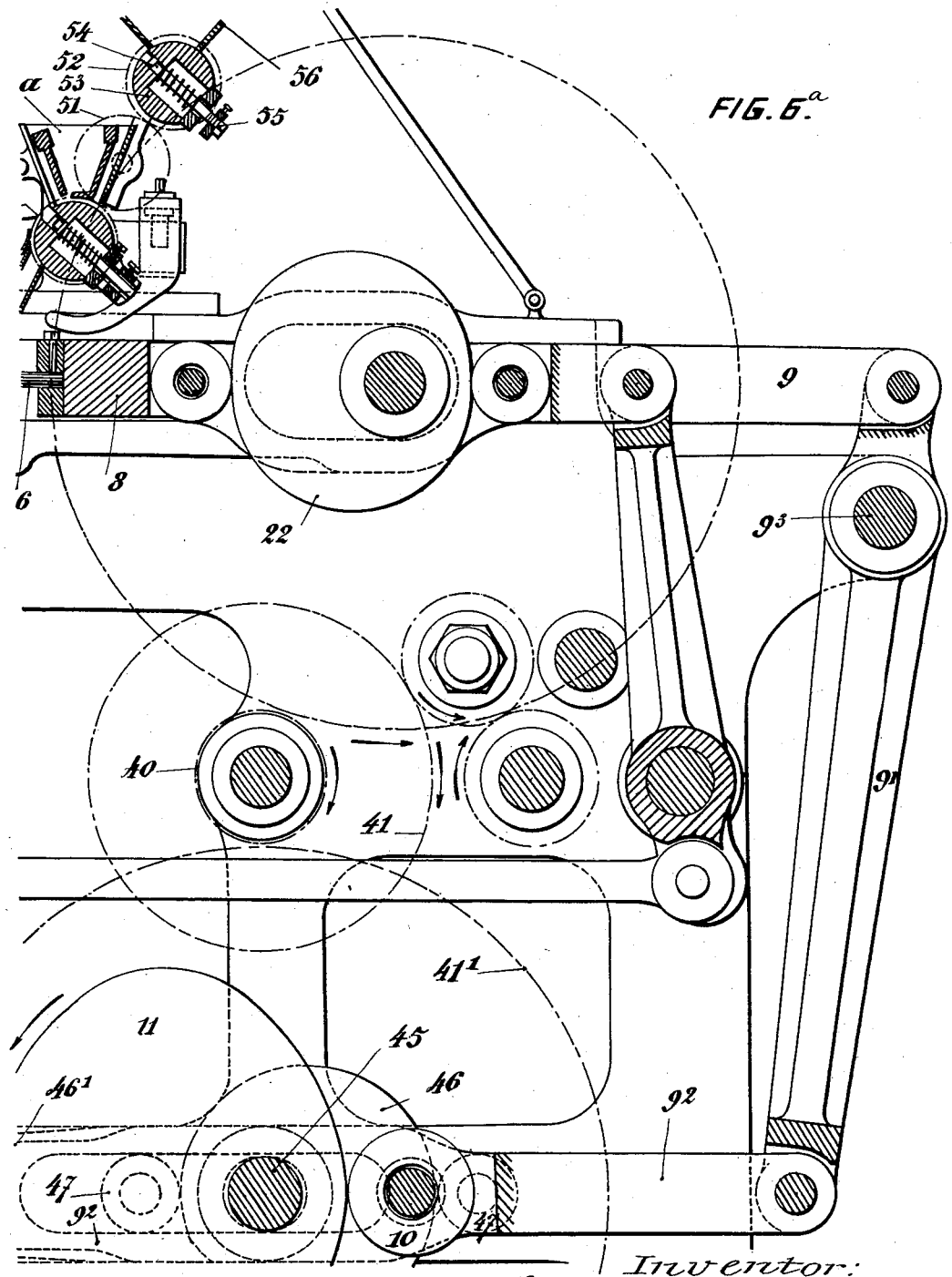

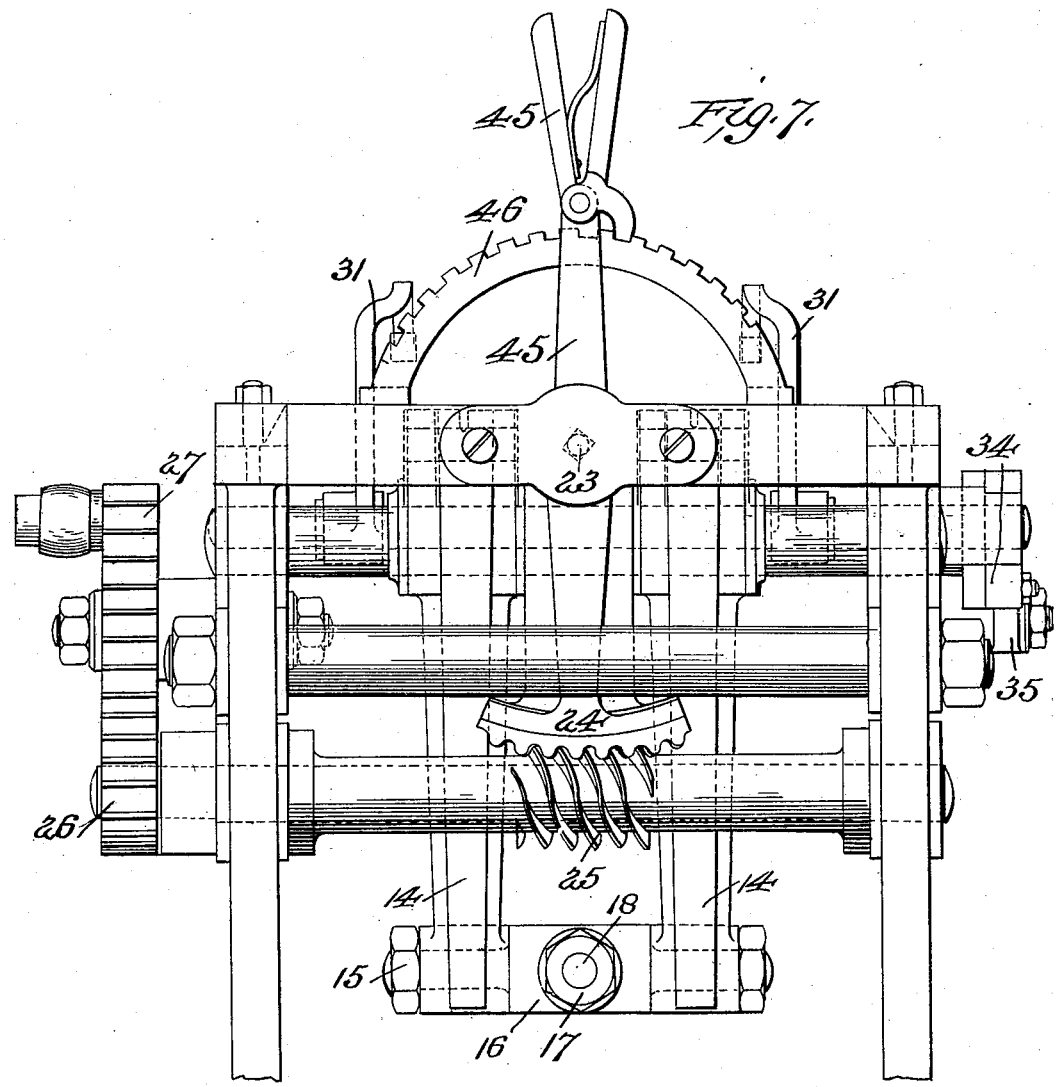

UNITED STATES PATENT OFFICE.

PAUL EUGÈNE MEINRAD JAMAIN, OF DIJON, FRANCE.

APPARATUS FOR COMPRESSING POWDERED SUBSTANCES.

SPECIFICATION forming part of Letters Patent No. 628,225, dated July 4, 1899.

Application filed December 2, 1897. Serial No. 660,533. (No model.)

*To all whom it may concern:*

Be it known that I, PAUL EUGÈNE MEINRAD JAMAIN, of the city of Dijon, (Côte d'Or,) France, have invented Improvements in Apparatus for Compressing Powdered Substances, (for which I have obtained Letters Patent in England for fourteen years, dated October 11, 1897, No. 23,355, and in Belgium for fifteen years, dated August 9, 1897, No. 129,987,) of which the following is a full, clear, and exact description.

This invention relates to a machine for compressing pharmaceutical and other powders into perfectly uniform tablets or lozenges.

In order that my invention may be readily understood, I have represented the same, but by way of example only, in the accompanying drawings, in which—

Figures 1 and 1$^a$ together show a side elevation of my apparatus as a whole. Figs. 2 and 2$^a$ together show a plan view of the same. Fig. 3 is a longitudinal vertical section through the apparatus. Fig. 4 is a vertical cross-section on the line 1 2 of Fig. 3. Fig. 5 is a detail view showing the toothed wheel and rack for actuating the distributing-cylinder and the hopper. Figs. 6 and 6$^a$ show in vertical longitudinal section a modification of my device. Fig. 7 is an end elevation of the mechanism for applying final pressure and the adjustment thereof.

Similar letters and numerals of reference are used to designate like parts in all the figures of the drawings.

As shown in the drawings, the powder which it is desired to compress into tablets of all forms and dimensions is fed into the hopper $a$, within which is arranged an agitator for preventing the powder from collecting and forcing it to enter the apertures $b$ of the movable cylinder $c$. This agitator consists of rods $h$, mounted upon a cross-piece $i$, to which is imparted an irregular oscillatory upward movement by means of a pinion $k$, provided with teeth upon a portion of its circumference only, and by means of levers $l$ and $l'$, this latter being provided with a tooth $m$, gearing with the teeth of the pinion $k$. While this is taking place rods $n$, mounted upon a cross-piece $o$, are actuated with a horizontal reciprocating motion in a direction transverse to the machine by means of an angle-piece $p$ and a rod $q$, carried by the cross-piece $i$ and engaging in a slot in the angle-piece $p$.

Within each of the apertures $b$ of the cylinder $c$ is arranged a piston $d$, the lower extremity of which is connected with a plate $e$, which is maintained constantly in contact with a curved part $f$ by means of springs $g$. The curved part $f$, placed at each extremity of the plate $e$, may be raised or lowered upon its support by means of screws $r$, so as to regulate the quantity of powder to be introduced into the apertures $b$.

The cylinder $c$ has imparted to it a rotary motion of a quarter-revolution by means of a pinion $s$, fixed upon the extremity of the cylinder and actuated by a rack $t$, fixed upon the frame of the machine. This movement of the cylinder $c$ is effected by the intermittent horizontal motion transmitted to the hopper and to its support $u$ by means of guides $v$, actuated by the double cams $x$ in contact with the rollers $x'$, carried by the guides $v$. The guides $v$ are connected with the mold-carrier $y$, which receives the powder coming from the cylinder $c$ through the ducts or conduits $z$. The mold-carrier, the conduits, the cylinder, and the hopper are thus rigidly connected and participate in the same sliding motion. A hammer 1, mounted upon a shaft 2, is set in motion each time the tooth 3 of the pinion $s$ lifts during its passage the ratchet 4, and upon the disengagement of the tooth strikes upon the conduits $z$ in order to cause the powder to fall into the apertures of the mold-carrier.

If while the apparatus is in operation it is desired for any reason to render the cylinder $c$ motionless, the pinion $s$ is thrown out of gear by acting upon the lever 5, so that the powder is no longer supplied by the cylinder, thereby preventing the occurrence of any agglomeration of powder while the machine is running.

The powder conducted to the mold is compressed by the front punches 6 and the rear punches 7 so as to form tablets. With this object the punches 6 are mounted in a support 8, upon which are fixed connecting-rods 9, provided with rollers 10, which are in contact with the cams 11. The rear punches 7 are mounted in a support 12, connected by means of links 13 to the levers 14, mounted upon a spindle 15, having at its middle portion a sleeve 16 for effecting regulation by means of the nuts 17, which are threaded upon the rod 18, fixed to the extremity of the lever 19. This lever 19 is connected with the guides 20, provided with rollers 21, which are in contact with the cam 22.

In order to relieve the lever 14 and rod 18 of part of the strain in applying the final pressure, I prefer to provide a screw 23, the forward end of which is positioned so as to contact with the rear face of the support 12 in the position of the parts just before the final pressure is given. The screw is operated by a sector 24, which gears with a worm 25, the shaft of which carries a gear 26, operated by a segmental gear 27, which is itself rocked by a connecting-rod 28, extending to the wheel 29.

In order to adjust the screw 23 to regulate the final pressure, its rear end is squared and has a sliding connection with a lever 45, which travels over a sector 46, which may be graduated, the lever being held in any desired position by a suitable pawl engaging the teeth of the sector. By rocking the lever the screw 23 will be screwed in or out in the sector 24.

The movement of the brush 30 is effected by means of a connecting-rod 34 and a lever 35, provided with a roller 36, which is held in contact with a cam 37 by means of a spring 38. The cams are mounted upon the driving-shaft 39, which also carries the wheel 29, and motion is imparted to them by means of the wheels 40, 41, 42, and 43, driven in any suitable manner.

The method of action is as follows: The machine having been started, the powder is fed into the hopper $a$, the apertures $b$ in the cylinder $c$ come opposite the lower openings of the hopper, and the agitator assists in introducing the powder into the apertures $b$ by preventing it from collecting. While the hopper is traveling toward the rear of the machine, the cylinder $c$ makes a quarter-revolution and the powder contained in its openings $b$ is distributed into the conduits $z$ under the influence of the pistons $d$, actuated by the parts $f$. From the conduits $z$ the powder falls into the conduits of the mold-carrier $y$, and in order that the powder may not adhere to the walls of the conduits $z$ the hammer strikes upon these latter. As soon as the powder has entered the molds the punches 6 and 7 approach each other in order to effect the compression action, which is at the same time increased by the screw 23. The powder having been compressed and the tablets formed the rear punches 7 retire and make way for the brush, which causes the tablets to fall into the conduit 32 and then cleans the punches. The operation being completed, the hopper returns to its initial position, the cylinder again presents its openings, into which the powder enters and is then distributed into the conduits $z$ to be compressed into tablets, and so on in continuation in the manner above described.

The modification shown, Fig. 6, more especially consists in a device serving to obtain a uniform distribution of the powdered substance in the matrices, so that the tablets or lozenges receive an equal thickness all over their surface after a uniform compression has been effected, while on the other hand the formation of cones by the powdered substance introduced into the matrices is thus avoided, which formation of cones, especially in the case where tablets or lozenges of large sizes are required, would have the result that tablets of irregular compression are produced. I arrange above the hopper $a$ a feed-reservoir 56, the bottom of which is formed by a movable cylinder 53, provided with a variable number of openings corresponding to the openings $b$ of the cylinder $c$ and in each of which a piston 54 is arranged, the position of which relatively to the amount of powdered substance to be supplied through the hopper $a$ is regulated by set-screws 55. The oscillatory movement of this cylinder 53 is obtained by toothed wheels 52, 51, and 50, the latter one being mounted on the shaft of the cylinder $c$. This powdered substance, especially in the case where tablets of large size are to be formed, is of course introduced in comparatively large quantities into the matrices or molds and is thus liable to form cones, which in proceeding with the operation result in the formation of tablets, the constituent mass of which is not regularly and evenly compressed.

In order to attain a uniform compression all over the surfaces of the tablets or lozenges, the powdered substance is, as previously, brought into the matrices between the punches; but the arrangement is such that the punches 7 engage sooner with the matrices and so that between these rear stamps 7 and the front stamp 6 the desired space is left. For this purpose the rear-stamp holder 12 receives a movement of translation through the medium of symmetrical levers 48, the path or stroke of which is regulated by the set-screw 49 according to the amount of powdered substance to be brought into the matrices. These levers 48 are connected by connecting-rods 46′, provided with friction-rollers 47, placed in contact with the cams 46, fixed on the shaft 45, which receives its movement from the toothed wheel 41′, actuated by the pinion 40. The connecting-rods 9, connected to the support 8, which holds the stamps 6, are pivotally connected to a lever 9′, which oscillates about the axis $9^3$. This lever 9′ has its lower end connected to a connecting-rod $9^2$, which carries the friction-rollers 10, which are in contact with the cam 11, keyed on the shaft 45, which latter receives its movement from the toothed wheel 41′, actuated by the pinion 40.

From the preceding description it will be readily understood that the powdered substance brought between the stamps will take up the whole free space, and as the stamps are set in motion the powdered substance filling the intermediate space will become evenly and energetically compressed all over the surface of the tablet or lozenge whatever may be its diameter and thickness.

It will of course be understood that the forms, dimensions, details, accessories, and the materials employed in the construction of my apparatus may all vary without thereby departing from the principle of my invention in any way.

I claim—

1. In a machine for compressing powders, the combination with the molds and punches, of a reciprocating feed-hopper, conduits for delivering the powders to the molds, a rotary cylinder having pockets corresponding to the conduits and arranged to convey charges of the powder from the hopper to the conduits and an agitator within the hopper, substantially as described.

2. In a machine for compressing powders, the combination with the molds and punches, of a reciprocating feed-hopper, conduits for delivering the powders to the molds, a rotary cylinder having pockets corresponding to the conduits and arranged to convey charges of the powder from the hopper to the conduits, and a knocking device arranged to knock against said conduits, substantially as described.

3. In combination, the molds, the punches, means for feeding powders to the molds, means for operating the punches to compress the powders, and brushes arranged to expel the formed tablets from and clean the faces of the punches with means for operating said brushes substantially as described.

The foregoing specification of my improvements in apparatus for compressing powdered substances signed by me this 12th day of November, 1897.

PAUL EUGÈNE MEINRAD JAMAIN.

Witnesses:
BENIGOE GUILLAKE,
CHARLES GAUREAN.